United States Patent
Okada (10) Patent No.: US 11,112,907 B2
(45) Date of Patent: Sep. 7, 2021

(54) ELECTRONIC DEVICE AND METHOD FOR CONTROLLING SAME

(71) Applicant: CANON KABUSHIKI KAISHA, Tokyo (JP)

(72) Inventor: Koichi Okada, Kunitachi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 116 days.

(21) Appl. No.: 16/362,136

(22) Filed: Mar. 22, 2019

(65) Prior Publication Data

US 2019/0294311 A1    Sep. 26, 2019

(30) Foreign Application Priority Data

Mar. 23, 2018 (JP) .............................. JP2018-056412

(51) Int. Cl.
*G06F 3/041* (2006.01)
*H04N 5/232* (2006.01)

(52) U.S. Cl.
CPC ........ *G06F 3/04186* (2019.05); *G06F 3/0412* (2013.01); *H04N 5/232* (2013.01)

(58) Field of Classification Search
CPC .. G06F 3/0416; G06F 3/03547; G06F 3/0488; G06F 3/0412; G06F 3/04886; G06F 2203/04104; G06F 3/04845; H04N 5/772; H04N 5/23212; H04N 5/2329; H04N 2101/00; H04N 5/23293
See application file for complete search history.

(56) References Cited

U.S. PATENT DOCUMENTS

| | | | | |
|---|---|---|---|---|
| 10,042,544 | B2* | 8/2018 | Heitman | G06F 3/017 |
| 10,187,514 | B2* | 1/2019 | Hong | G06F 3/0482 |
| 2002/0066158 | A1* | 6/2002 | Breed | E05C 17/203 16/64 |
| 2007/0097081 | A1* | 5/2007 | Ohshita | G06F 3/023 345/168 |
| 2009/0003817 | A1* | 1/2009 | Suzuki | H04N 5/23212 396/124 |
| 2011/0115925 | A1* | 5/2011 | Oh | H04N 5/232 348/207.99 |
| 2011/0256848 | A1* | 10/2011 | Bok | G06F 3/048 455/411 |
| 2013/0242160 | A1* | 9/2013 | Ishihara | H04N 5/232933 348/333.12 |
| 2013/0342731 | A1* | 12/2013 | Lee | H04N 5/23218 348/231.4 |

(Continued)

*Primary Examiner* — William Lu
(74) *Attorney, Agent, or Firm* — Cowan, Liebowitz & Latman, P.C.

(57) ABSTRACT

When a first screen is displayed on a display surface, for a touch operation in which a duration time of a touch on the operation surface is less than a predetermined time, a function corresponding to the touch operation is not performed, and in response to a predetermined touch operation in which the duration time of the touch on the operation surface is at least the predetermined time, a first function corresponding to the predetermined touch operation is performed. When a second screen is displayed on the display surface, a second function is performed in response to a touch operation in which the duration time of the touch on the operation surface is less than the predetermined time.

13 Claims, 7 Drawing Sheets

(56) References Cited

U.S. PATENT DOCUMENTS

| | | | |
|---|---|---|---|
| 2015/0199098 A1* | 7/2015 | Park | H04N 7/18 |
| | | | 715/790 |
| 2015/0334291 A1* | 11/2015 | Oho | H04N 5/23293 |
| | | | 348/222.1 |
| 2017/0104922 A1* | 4/2017 | Matsushima | H04N 5/23293 |
| 2017/0155825 A1* | 6/2017 | Yoshikawa | H04N 5/77 |
| 2017/0269772 A1* | 9/2017 | Noto | G06F 3/04184 |

* cited by examiner

ELECTRONIC DEVICE AND METHOD FOR CONTROLLING SAME

BACKGROUND OF THE INVENTION

Field of the Invention

The present invention relates to an electronic device and a method for controlling the same.

Description of the Related Art

An electronic device including a touch panel is easily operable by a user but is likely to be falsely operated since the touch panel is arranged at an easily-touched position. For example, the false operation may be prevented by the invalidation of a touch panel operation, but usability is impaired instead. Like this, simply disenabling an operation is useful for preventing a false operation but possibly causes hesitation in using the function.

US 2007/097081 A1 discloses a method in which an input prohibition state for a predetermined time is set by a timer to prevent a false operation and is cancelled immediately after detecting a movement operation for at least a certain distance in controlling the touch pad of a notebook PC. According to this method, the effect of an improvement in usability is expected compared with simple invalidation.

SUMMARY OF THE INVENTION

However, the method disclosed in US 2007/097081 A1 may not distinguish between an intended movement operation and a false operation, for example, when a finger or an object falsely touches the surface of a touch pad in a sliding manner. Accordingly, the method is not valid as a method for reliably preventing the occurrence of a false operation in a scene in which the false operation is not allowed or the like.

The present invention has been made in view of the above circumstances and has an object of providing a false operation prevention technology capable of preventing a false operation as much as possible in a situation in which the false operation of a touch panel is not desirable and placing priority on preventing the degradation of operability in a situation in which false operation prevention is not important.

The present invention provides an electronic device comprising: a detector capable of detecting a touch operation on an operation surface; and a memory and at least one processor which function as a control unit, wherein the control unit performs control such that, when a first screen is displayed on a display surface, for a touch operation in which a duration time of a touch on the operation surface is less than a predetermined time, a function corresponding to the touch operation is not performed, and in response to a predetermined touch operation in which the duration time of the touch on the operation surface is at least the predetermined time, a first function corresponding to the predetermined touch operation is performed, and the control unit performs control such that, when a second screen is displayed on the display surface, a second function is performed in response to a touch operation in which the duration time of the touch on the operation surface is less than the predetermined time.

According to an embodiment of the present invention, it is possible to provide a false operation prevention technology capable of preventing a false operation as much as possible in a situation in which the false operation of a touch panel is not desirable and placing priority on preventing the degradation of operability in a situation in which false operation prevention is not important.

Further features of the present invention will become apparent from the following description of exemplary embodiments with reference to the attached drawings.

DESCRIPTION OF THE EMBODIMENTS

Configuration of Electronic Device

Figure 1:
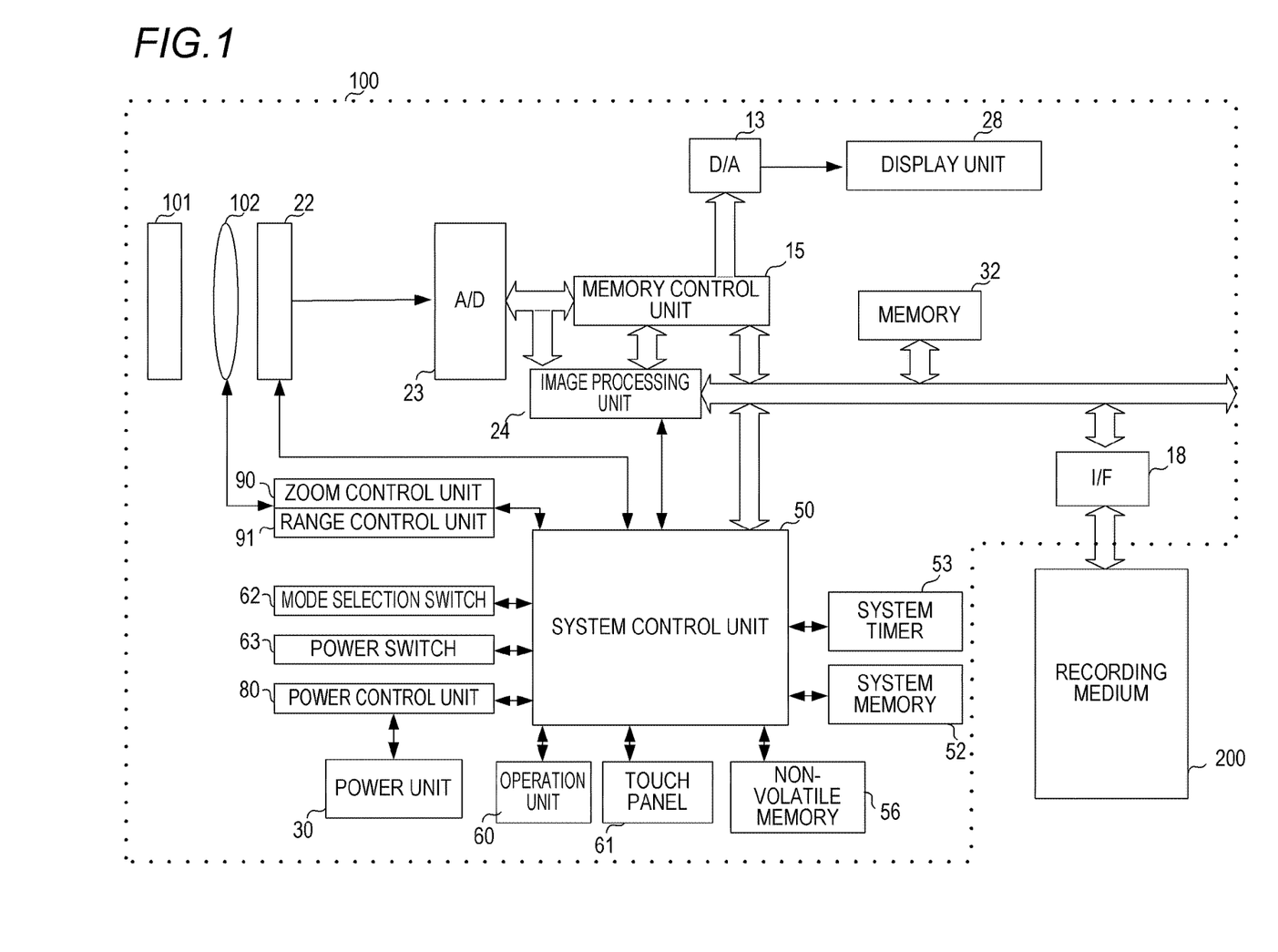
FIG. 1 is a configuration diagram of an electronic device according to an embodiment of the present invention.

FIG. 1 is a block diagram showing a configuration example of a digital video camera (digital camcorder) 100 that is an embodiment of an electronic device according to the present invention.

In FIG. 1, a shooting lens 102 is a lens group including a zoom lens and a focus lens. The zoom lens is a lens for changing a focal distance to change zoom magnification and controlled by a zoom control unit 90. The focus lens is a lens for adjusting focus and controlled by a range control unit 91. An imaging unit 22 is an imaging element constituted by a CCD, a CMOS, or the like that converts an optical image into an electric signal. An A/D converter 23 converts an analog signal into a digital signal. The A/D converter 23 is used to convert an analog signal output from the imaging unit 22 into a digital signal. A barrier 101 covers an imaging system including the shooting lens 102 and the imaging unit 22 of the digital video camera 100 to prevent the stain or breakage of the imaging system. An image processing unit 24 performs resize processing such as predetermined pixel interpolation and reduction or color conversion processing on data from the A/D converter 23 or data from a memory control unit 15. In addition, the image processing unit 24 performs predetermined calculation processing using the data of a captured image, and a system control unit 50 performs exposure control and range control on the basis of a result of the calculation. Thus, AF (Automatic Focusing) processing in a TTL (Through The Lens) system, AE (Automatic Exposure) processing, and EF (Flash Pre Emission) processing are performed. The image processing unit 24 may further perform predetermined calculation processing using the data of a captured image and perform AWB (Automatic White Balance) processing in a TTL system on the basis of a result of the calculation.

Output data from the A/D converter 23 is written into a memory 32 via the image processing unit 24 and the memory control unit 15 or via the memory control unit 15. The memory 32 stores image data obtained by the imaging unit 22 and converted into digital data by the A/D converter 23 or image data to be displayed on a display unit 28. The memory 32 includes storage capacity enough to store a predetermined number of still images or moving images and sounds for a predetermined time. In addition, the memory 32 serves as a memory (video memory) for displaying data read out from a recording medium 200 or an image such as an OSD (On-Screen Display). A D/A converter 13 converts data for image display stored in the memory 32 into an analog signal and supplies the converted data to the display unit 28. Thus, image data for display written into the memory 32 is displayed on the display unit 28 via the D/A converter 13. The display unit 28 performs display corresponding to an analog signal from the D/A converter 13. A digital signal once A/D-converted by the A/D converter 23 and accumulated in the memory 32 is analog-converted by the D/A converter 13 and then sequentially transferred to and displayed on the display unit 28. In the manner described above, through-image display is allowed.

In the present embodiment, the display unit 28 is a liquid crystal display. However, the display unit 28 is not limited to a liquid crystal display, and another type of a display such as an organic EL (Electro Luminescence) display may be employed. In addition, a liquid crystal display is used as the display unit 28 in the present embodiment, but a view finder or an external display connected via display output such as HDMI™ and SDI may be used as such. Moreover, the display unit 28 may include a plurality of these display output.

A non-volatile memory 56 is an electrically deletable and recordable memory, and an EEPROM or the like is, for example, used as such. The non-volatile memory 56 stores a constant for operating the system control unit 50, a program, or the like. Here, the program represents a program for performing various flowcharts that will be described later in the present embodiment. The system control unit 50 controls the entire digital video camera 100. The system control unit 50 performs the program recorded on the non-volatile memory 56 to realize respective processing in the present embodiment that will be described later. Reference symbol 52 denotes a system memory, and a RAM that is a volatile memory is used as such. In the system memory 52, the constant for operating the system control unit 50, a variable, the program read out from the non-volatile memory 56, or the like is developed. In addition, the system control unit 50 controls the memory 32, the D/A converter 13, the display unit 28, or the like to perform display control.

A system timer 53 is a time measurement unit that measures a time used for various control or a time of an embedded clock. A mode selection switch 62, an operation unit 60, and a touch panel 61 are operation units for inputting various action instructions to the system control unit 50. The respective operation members of the operation unit 60 include various function selection buttons such as a menu button, a cancel button, an arrow key, a SET button, and an AF/MF button. For example, when the menu button is pressed, a menu screen allowing various settings is displayed on the display unit 28. A user may intuitively perform the various settings using the menu screen displayed on the display unit 28, a four-way button in vertical and horizontal directions, and the SET button.

The operation unit 60 includes a shutter button allowing the two-level operation of half press and full press. A first shutter switch signal SW1 is generated when the shutter button is partially operated, i.e., when the shutter button is half-pressed (shooting preparation instruction). With the first shutter switch signal SW1, an action such as AF (Automatic Focusing) processing, AE (Automatic Exposure) processing, AWB (Automatic White Balance) processing, and EF (Flash Pre Emission) processing is started. A second shutter switch signal SW2 is generated when the shutter button is completely operated, i.e., when the shutter button is fully pressed (shooting instruction). With the second shutter switch signal SW2, the system control unit 50 starts the action of a series of shooting processing from the reading of a signal from the imaging unit 22 to the writing of image data into the recording medium 200. In addition, the operation unit 60 includes a REC button for providing an instruction to start shooting a moving image (moving-image recording). When the REC button is pressed in a shooting standby state in which a live view is being shot by the imaging unit 22, the recording of a moving image is started in which a moving image shot by the imaging unit 22 is recorded on the recording medium 200 as a moving-image file.

The touch panel 61 is an input device capable of detecting a touch operation on its operation surface. The touch panel 61 and the display unit 28 may be integrated with each other to configure a touch panel display. For example, the touch panel 61 is configured such that the transmittance of light does not disturb the display of the display unit 28, and is attached onto the upper layer of the display surface of the display unit 28. Further, input coordinates in the touch panel 61 and display coordinates on the display screen of the display unit 28 are set to correspond to each other. Thus, a GUI (Graphical User Interface) with which the user feels as if he/she were capable of directly operating a screen displayed on the display unit 28 may be provided. The system control unit 50 is capable of detecting the following operations or states on the touch panel 61.

A state in which a finger or a pen that has not touched the touch panel 61 newly touches the touch panel 61, i.e., the start of a touch (hereinafter called touch-down).

A state in which the touch panel 61 is touched by a finger or a pen (hereinafter called touch-on).

A state in which a finger or a pen moves while touching the touch panel 61 (hereinafter called touch-move).

A state in which a finger or a pen that has touched the touch panel 61 is released, i.e., the end of a touch (hereinafter called touch-up).

A state in which nothing has touched the touch panel 61 (hereinafter called touch-off).

The system control unit 50 detects the touch-on simultaneously with the detection of the touch-down. The system control unit 50 continues to detect the touch-on unless the touch-up is detected after the touch-down. The system control unit 50 also detects the touch-on when detecting the touch move. However, even if the touch-on has been detected, the system control unit 50 does not detect the touch-move unless a touch position has been moved. After detecting the touch-up of all touched fingers or pens, the system control unit 50 detects the touch off.

The system control unit 50 is notified of these operations and states or position coordinates at which a finger or a pen has touched the touch panel 61 via an internal bus. On the basis of notified information, the system control unit 50 determines what operation (touch operation) has been performed on the touch panel 61. For the touch move, the system control unit 50 may also determine the movement direction of a finger or a pen that moves on the touch panel 61 for each vertical component and each horizontal component on the touch panel 61 on the basis of the changes of position coordinates. The system control unit 50 determines that a slide operation has been performed when detecting the touch move for least a predetermined distance. The operation of quickly moving a finger for a certain distance and then releasing the same in a state of touching the touch panel will be called a flick. In other words, the flick is the operation of quickly tracing the touch panel 61 so as to be flipped with a finger. The system control unit 50 may determine that the flick has been performed when detecting that the touch-move has been performed at least for a predetermined distance and at least at predetermined speed and then the touch-up has been performed in succession to the touch-move (the flick has been performed in succession to the slide operation).

Moreover, the touch operation of simultaneously touching a plurality of places (for example, two points) and making the touched positions get close to each other will be called pinch-in, and the touch operation of making the touched positions get away from each other will be called pinch-out. The pinch-out and the pinch-in will be generically called a pinch operation (or simply a pinch).

The touch panel 61 may be of any type among touch panels such as a resistance film type, a capacitance type, a surface acoustic type, an infrared type, an electromagnetic induction type, an image recognition type, and an optical sensor type. Some touch panels include a type that detects a touch when a touch panel is touched and a type that detects a touch when a finger or a pen approaches a touch panel, but any of the touch panels may be used.

In addition, the touch panel 61 may be configured as a touch operation unit (for example, so-called a touch pad) in which nothing is particularly displayed on an operation surface (the operation surface does not serve as the display surface of the display unit 28). Even if being configured as a touch pad, the touch panel 61 is capable of performing various processing that will be described later.

The mode selection switch 62 changes the action mode of the system control unit 50 into any of a moving-image recording mode, a reproduction mode, or the like. A power switch 63 is an operation unit for turning on or off the power of the digital video camera 100. A power control unit 80 is constituted by a battery detection circuit, a DC-DC convertor, a switch circuit for switching a block to be energized, or the like, and detects the loading of a battery, the type of a battery, and the remaining amount of a battery. In addition, the power control unit 80 controls the DC-DC convertor on the basis of its detection result and an instruction from the system control unit 50, and supplies required voltage to respective units including the recording medium 200 over a required period. The power unit 30 is constituted by a primary battery such as an alkali battery and a lithium battery, a secondary battery such as a NiCd battery, a NiMH battery, and a Li battery, an AC adapter, or the like. A recording medium I/F 18 is an interface with the recording medium 200 such as a memory card and a hard disk. The recording medium 200 is a recording medium such as a memory card for recording a shot image and constituted by a semiconductor memory, a magnetic disk, or the like.

Display Examples of Screens

Figure 2A:
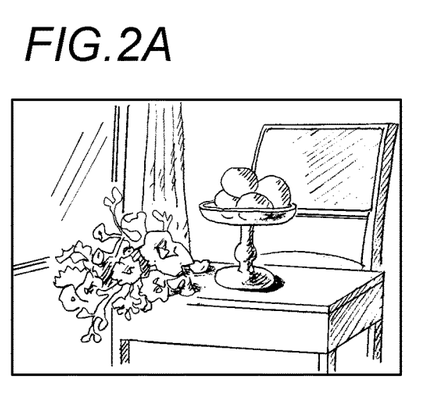
FIGS. 2A to 2C are display examples of the screens of the electronic device.
Figure 2B:
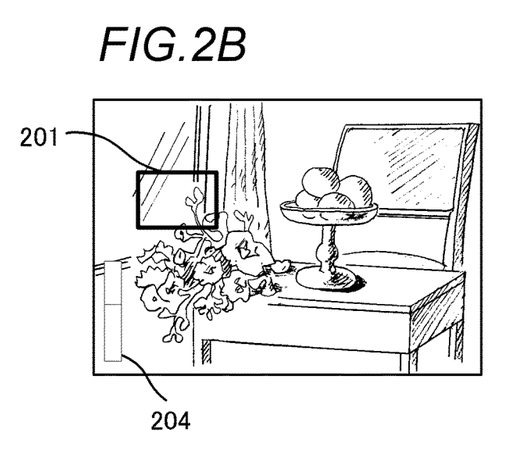
Figure 2C:
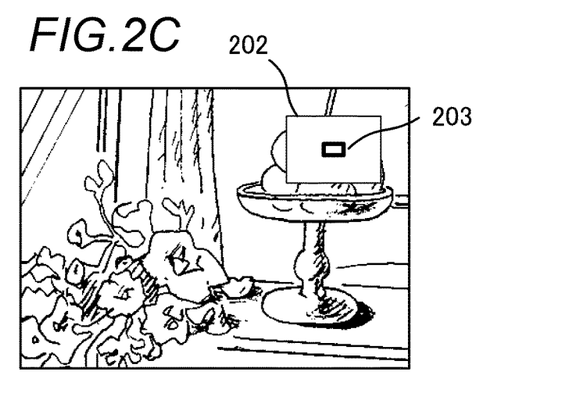

FIGS. 2A to 2C are examples of screens displayed on the display unit 28. FIG. 2A is a shooting standby screen (first screen) on which a camera image (a live-view (LV) image captured by the imaging unit 22) has been reflected. The shooting standby screen is a reference screen. Only the LV image has been displayed in an example shown in FIG. 2A, but information showing various shooting settings such as a remaining shooting available time for shooting a moving image, a shooting mode, image quality, and a frame rate may be displayed simultaneously. When the digital video camera 100 is activated in a shooting mode, the display unit 28 is brought to a display state (shooting standby screen) shown in FIG. 2A. On the shooting standby screen, no function is assigned to touch-move. Meanwhile, the "setting of an AF position" is assigned to touch-down. By touching any position on a live-view image, the user may set the touched position as an AF position.

FIG. 2B is a shooting standby screen displayed when an AF frame representing an indicator for indicating an automatically-focused object is added to the screen displayed in FIG. 2A. This AF frame is movable to any position on the screen. The operation of moving the AF frame is performed using the touch panel 61 or the operation unit 60. In the present embodiment, it is assumed that the AF frame is movable to a touch position when the desired position is touched on the touch panel 61. Reference symbol 204 denotes an indicator for displaying the progress of a timer. The indicator 204 is displayed in an overlapped state when the response time of the touch panel 61 is set. The indicator 204 shows a remaining time until a duration time (touch duration time) since the start of a touch operation reaches a response time, i.e., a remaining time until the touch operation becomes valid. The details of the action of the indicator 204 will be described later.

FIG. 2C is an enlarged display screen (live-view enlargement) on which the center of the image of FIG. 2A has been displayed in an enlarged manner. Such enlarged display is used for the purpose of adjusting focus when focus adjustment is manually performed (when manual focus (MF) is performed), or the like. The enlarged display is the function of enlarging a display image on the display unit 28 and does not intend to enlarge an image recorded on the recording medium 200. In FIG. 2C, reference symbols 202 and 203 are guide display for confirming what range has been enlarged in the image. Reference symbol 202 denotes the image range of FIG. 2A, and reference symbol 203 denotes the image range of FIG. 2C. An enlarged position may be moved. For example, the user may touch an image during enlarged display and perform touch-move on the image to change its enlarged position (enlarged range). It is assumed that the display and the movement of an AF frame are not allowed in the enlarged display of FIG. 2C. In addition, it is assumed that a function performed corresponding to touch-down is not assigned in the enlarged display screen in the present embodiment.

Response Speed of Operation of Touch Panel

Figure 3A:
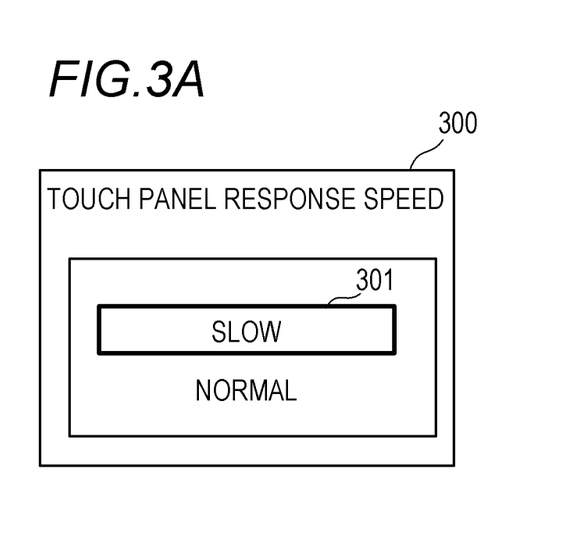
FIGS. 3A and 3B are examples of menu screens for changing the settings of the electronic device.
Figure 3B:
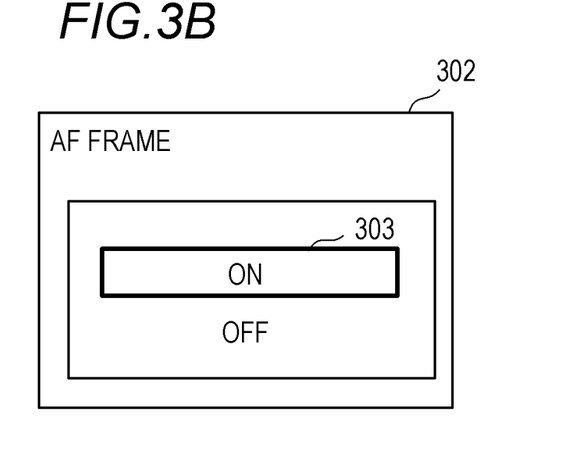

FIG. 3A is an example of a menu for setting the response speed of the operation of the touch panel 61. A menu screen 300 is a menu screen for preventing the false operation of the touch panel 61 or the like and used to set a response time required until the digital video camera 100 makes a response after the user touches the touch panel 61. A cursor 301 is a cursor for selecting a setting. In the example of FIG. 3A, the response speed may be selected from among two response speed, i.e., "normal" response speed and "slow" response speed. In the setting of the "normal" response speed, the digital video camera 100 makes a response immediately after the touch panel 61 is operated. On the other hand, in the setting of the "slow" response speed, the digital video camera 100 does not make a response unless the touch panel 61 is continuously touched for at least a predetermined time. That is, even if the touch panel 61 is touched, the touch operation of the touch panel 61 is not accepted unless the touch panel 61 is touched for at least the predetermined time. The response speed (that is, a delay time required until the digital video camera 100 makes a response after the start of a touch) in the setting of the "slow" response speed may be a fixed value or may be changed by the user. When the response speed is made changeable by the user, the user is only required to input or select a delay time on a menu screen like the one shown in, for example, FIG. 3A. Note that the two levels of the response speed are settable in FIG. 3A, but the response speed may be selected from among three or more setting values. FIG. 3B is a menu screen 302 for setting ON (shown)/OFF (hidden) of the display of an AF frame. The user moves a cursor 303 to select ON/OFF of the display of the AF frame.

Example of Control Method

Figure 4:
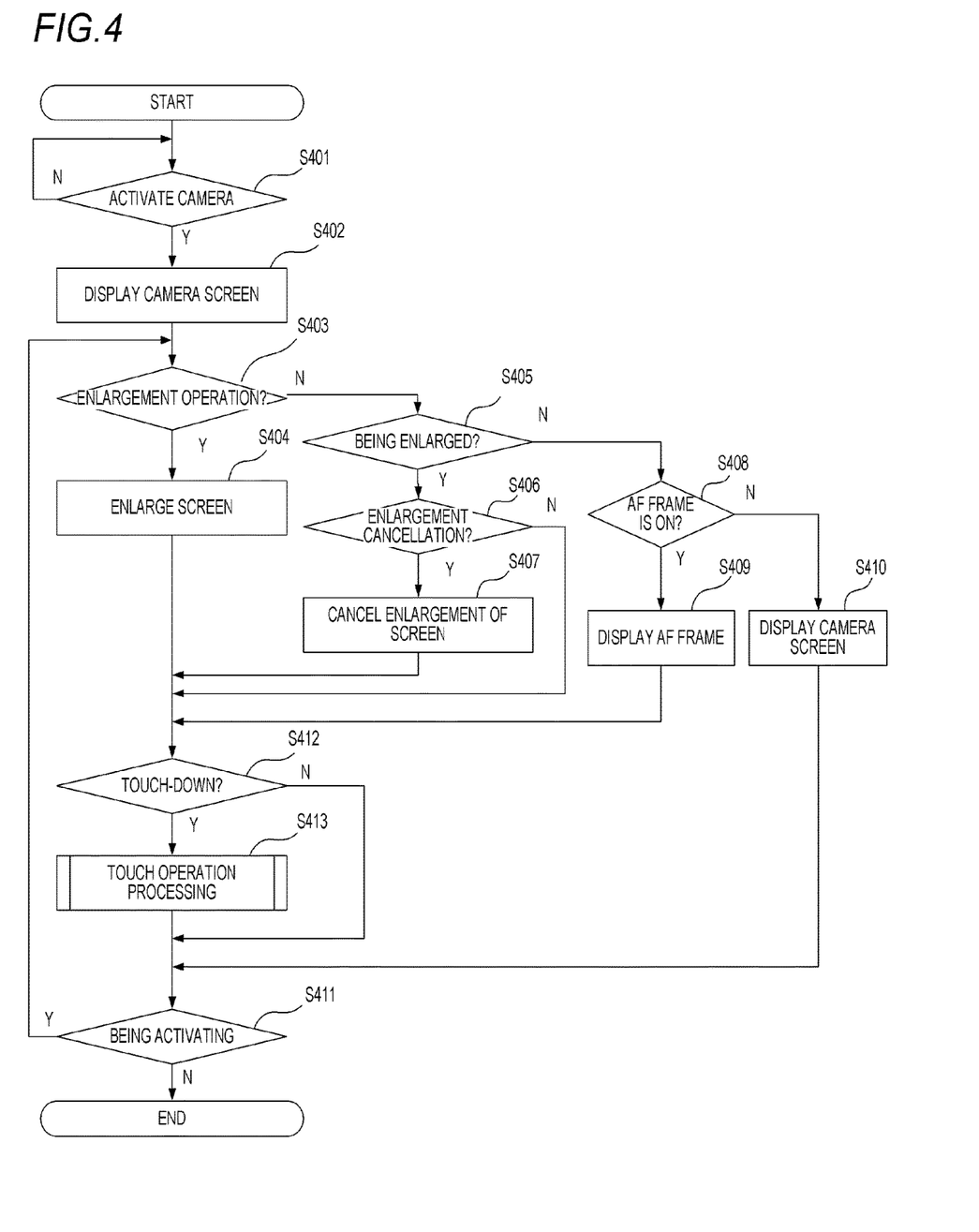
FIG. 4 is an example of a flowchart of a method for controlling the electronic device.
Figure 5:
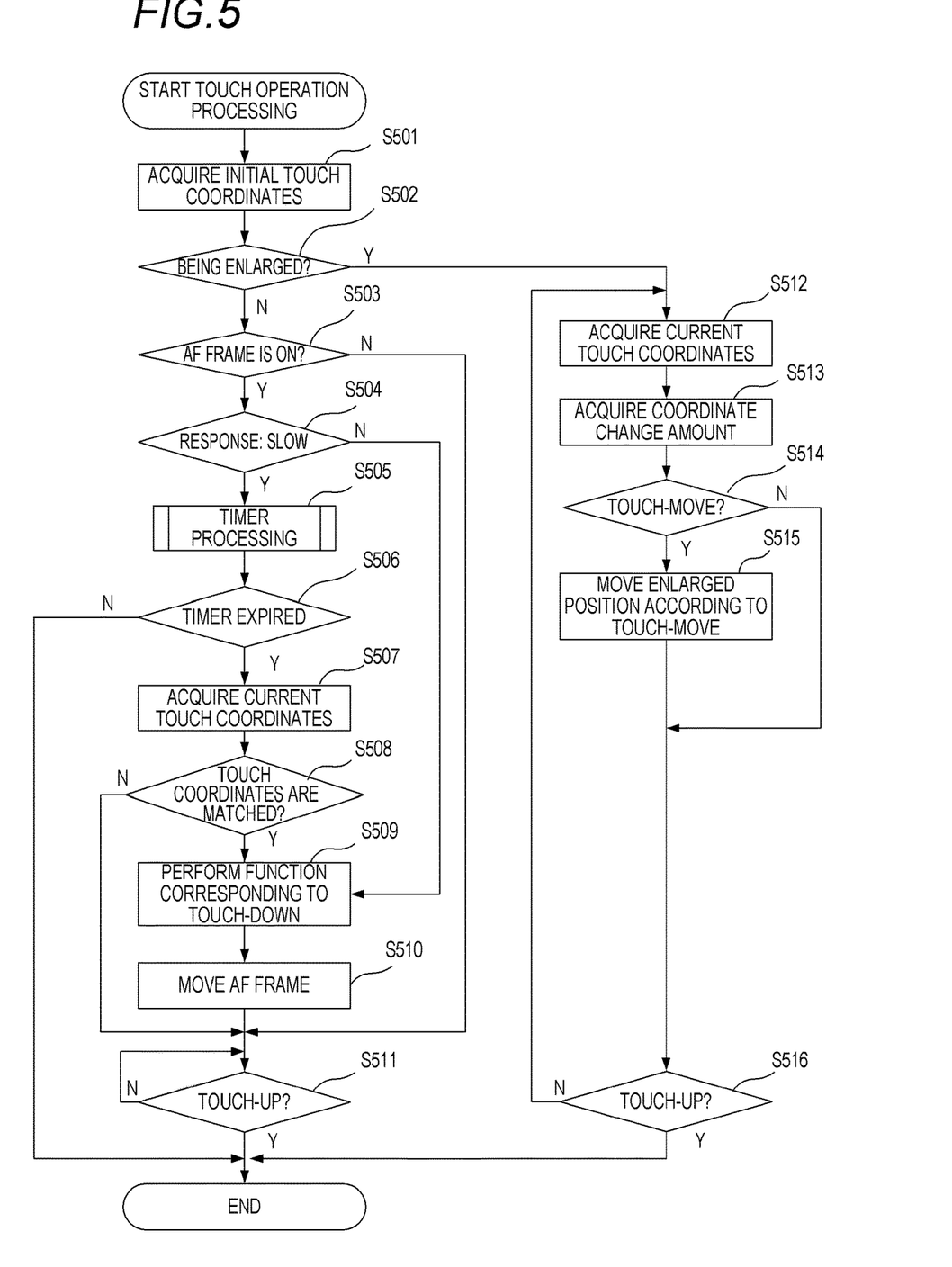
FIG. 5 is an example of a flowchart showing the details of touch operation processing shown in FIG. 4.
Figure 6:
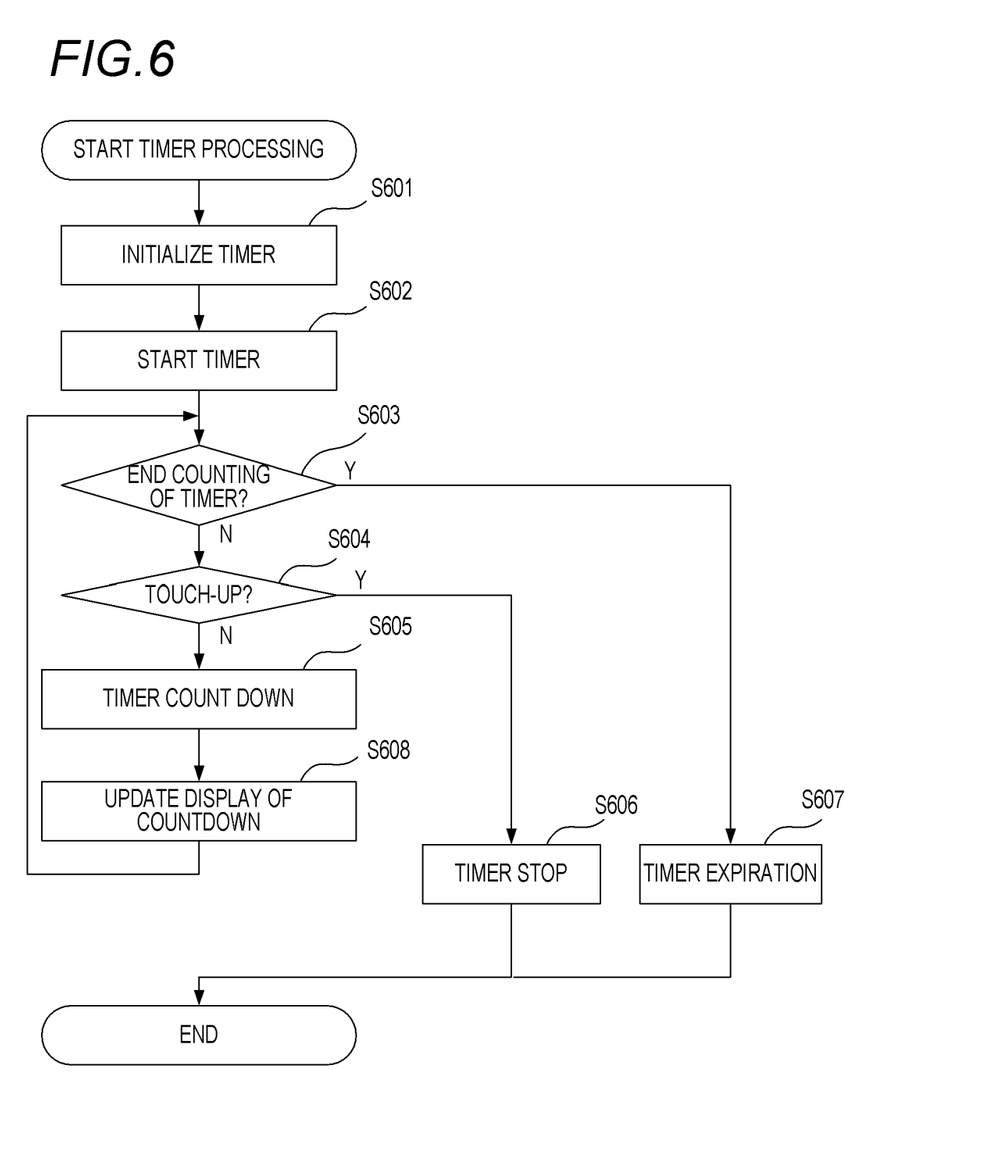
FIG. 6 is an example of a flowchart showing the details of timer processing shown in FIG. 5.

An example of a method for controlling the digital video camera 100 according to the present embodiment will be described with reference to FIGS. 4 to 6. FIGS. 4 to 6 are flowcharts showing the flow of the action of the digital video camera 100. Unless otherwise specifically noted, the processing of FIGS. 4 to 6 is performed by the system control unit 50 (the processing including processing in which other function units or devices act under the control of the system control unit 50). Specifically, the processing shown in the flowcharts of FIGS. 4 to 6 is realized when the system control unit 50 develops a program stored in the non-volatile memory 56 into the system memory 52 and performs the developed program. The following description will be advanced using an action performed when the "slow" response speed has been set during the operation of the touch panel 61 according to the menu of FIG. 3A as an example. Particularly, the example of the action is characterized in that the setting of the response speed becomes valid on the shooting standby screen (entire display) of FIG. 2A, and that the setting of the response speed becomes invalid on the shooting standby screen (enlarged display) of FIG. 2C.

FIG. 4 is a flowchart showing the action flow of the screen display of the display unit 28 of the digital video camera 100 according to the present embodiment, and shows the transition of the screens shown in FIGS. 2A to 2C. When the user operates the power switch 63 to turn on the power of the camera, the system control unit 50 determines the activation of the camera in S401 and then displays a camera screen in S402. The screen displayed here is equivalent to the screen of FIG. 2A. When detecting that the operation of performing enlarged display has been performed in S403 in this state, the system control unit 50 proceeds from S403 to S404 to enlarge the screen. The screen displayed here is equivalent to the screen of FIG. 2C. After the enlargement, the system control unit 50 confirms whether a touch-down operation has been performed in S412. When the touch-down operation has been performed, the system control unit 50 proceeds to touch operation processing in S413 to perform the touch operation processing. When the operation of the touch-down has not been performed, the system control unit 50 confirms whether the camera has been activated in S411. When the camera has been activated, the system control unit 50 repeatedly performs the processing after the processing of S403. When the camera has not been activated, the system control unit 50 ends the processing. The details of the touch operation processing of S413 will be described with reference to FIG. 5. When detecting that the enlargement operation has not been performed in S403, the system control unit 50 proceeds to S405. When the screen has been under enlarged display, the system control unit 50 confirms whether an enlargement cancellation operation has been performed in S406. When the enlargement cancellation operation has been performed, the system control unit 50 proceeds to S407 to perform the enlargement cancellation processing of the screen and then proceeds to the determination of the touch-down of S412. Here, when the touch-down has been detected, the operation of moving an AF frame is likely to be performed. Therefore, the system control unit 50 performs the touch operation processing in S413.

The screen in S407 may be either the screen of FIG. 2A or the screen of FIG. 2B but depends on the setting of the AF frame shown in FIG. 3B. When it is determined that the enlargement cancellation operation has not been performed in S406, the system control unit 50 proceeds to S412. At this time, the operation of changing an enlarged position is likely to be performed in the touch-down operation. When it is determined that the screen has not been under the enlarged display in S405, the system control unit 50 proceeds to the control of displaying the AF frame. In S408, the system control unit 50 refers to the setting of the AF frame shown in FIG. 3B to confirm whether the AF frame has been turned on. When the AF frame has been turned on, the system control unit 50 proceeds to S409 to display an AF-frame screen. The screen displayed here is equivalent to the screen of FIG. 2B. In the following processing after the determination of the touch-down of S412, the AF frame is likely to be moved. On the other hand, when it is determined that the AF frame has been turned off in S408, the system control unit 50 proceeds to S410 to display a camera screen that does not have the AF frame. The screen displayed here is equivalent to the screen of FIG. 2A. At this time, since no object subjected to a touch panel operation exists, the system control unit 50 does not proceeds to S412 but proceeds to S411.

FIG. 5 is a detailed flowchart of the touch operation processing of S413 in FIG. 4. In addition, FIG. 5 is the flowchart for describing how the setting of the touch panel response speed in FIG. 3A has influence on the acceptance of a touch panel operation depending on the screens shown in FIGS. 2A to 2C.

Since the touch-down has been detected in S412 of FIG. 4 that is a process leading to this processing, the system control unit 50 acquires coordinates showing an initial touch position in S501 and then confirms whether the touch position has been under enlarged display in S502. When the touch position has been under the enlarged display, the system control unit 50 proceeds to S512. When the touch position has not been under the enlarged display, the system control unit 50 proceeds to S503. In S503, the system control unit 50 refers to the setting of the menu screen 302 of FIG. 3B to confirm whether the AF frame has been displayed. When the AF frame has been displayed, the system control unit 50 proceeds to S504. When the AF frame has not been displayed, the system control unit 50 proceeds to S511. In S504, the system control unit 50 refers to the setting of the menu screen 300 of FIG. 3A to confirm the setting of the response speed of the touch panel 61. When the "slow" touch panel response speed has been set, the system control unit 50 proceeds to S505 to perform timer processing for making a slow response to an operation. The details of the timer processing will be described later with reference to FIG. 6. When the "slow" touch panel response speed has not been set, the operation of the touch-down is immediately accepted. Therefore, the system control unit 50 proceeds to S509 to accept the touch-down as a valid operation and performs a function corresponding to the touch-down. Here, the system control unit 50 sets a position to be subjected to AF at a position corresponding to the position of the touch-down to perform the function corresponding to the touch-down. In S510, the system control unit 50 moves the AF frame to the initial touch coordinates (that is, the position of the touch-down) acquired in S501. With the setting (movement) of the position of the AF frame in the manner described above, AF based on the position of the AF frame after the movement is performed. The movement of the AF frame is allowed even when a moving image is being recorded. During the recording of a moving image, a position that is to be automatically focused immediately changes with the movement of the AF frame according to the touch-down, and the focus position of a recorded image changes.

The details of the timer processing of S505 are shown in FIG. 6. When the present processing is invoked, the system control unit 50 initializes the system timer 53 in S601 and then starts driving the timer in S602. Here, it is assumed that the setting time of the timer (that is, a delay time until a response is made after the start of a touch) is one second. The setting time is not limited to one second but is practically set at about 200 milliseconds to two seconds for the purpose of preventing a malfunction occurring when the touch panel is touched and released by mistake as in a case in which a part of a body unintentionally touches the touch panel. In S603, the system control unit 50 determines whether the counting of the timer has ended. When the counting of the timer has not ended, the system control unit 50 proceeds to S604 to confirm whether touch-up has been performed. When the touch-up has not been performed, i.e., when the state of touch-on has been held, the system control unit 50 proceeds to S605 to perform the count-down of the timer. Then, the system control unit 50 performs processing for updating the display of the indicator 204 of FIG. 2B and determines whether the counting of the timer has ended in S603 again. When it is determined that the counting of the timer has ended in S603, the system control unit 50 proceeds to S607 to perform processing for notifying the expiration of the timer and ends the timer processing. When detecting the touch-up during the count-down of the timer in S604, i.e., when the touch operation has been cancelled, the system control unit 50 proceeds to S606 to stop the processing of the timer.

Referring back to FIG. 5, the system control unit 50 determines whether the timer has expired as a result of the timer processing in S506. When having detected the expiration of the timer in S607, i.e., when the state of the touch-on has been held for at least the setting time of the timer, the system control unit 50 proceeds to S507. Otherwise, i.e., when the processing of the timer has been stopped in S606, the system control unit 50 ends the touch operation processing without performing a function corresponding to the touch operation at this time. In S507, the system control unit 50 acquires the coordinates (current touch coordinates) of a touch position after the elapse of the setting time and determines whether the current touch coordinates match the initial touch coordinates (touch-down coordinates) acquired in S501. When the difference between the current touch coordinates and the touch-down coordinates is within a predetermined distance (i.e., when the user has held down the same position on the touch panel), the system control unit proceeds to S509. As described above, the system control unit 50 proceeds to S509 to perform the function corresponding to the touch-down and then proceeds to S510 to move the AF frame. On the other hand, when the current touch coordinates do not match the initial touch coordinates in S508, the system control unit 50 does not perform the processing of S509 and S510. Therefore, no processing is performed in the present example (the function corresponding to the touch-down is not performed). After that, when detecting touch-up, the system control unit 50 ends the present processing in S511.

On the other hand, when it is determined that the touch position has been under the enlarged display in S502, the system control unit 50 does not display the AF frame and performs processing for determining whether a touch operation (touch-move in the present embodiment) for moving the enlarged position has been performed. The operation of changing the enlarged position is an operation for a display image that is not to be recorded. Even if the enlarged position is falsely changed, no influence is exerted upon a recorded image. Therefore, the need for preventing a malfunction due to which the enlarged position is falsely changed is not high, and the need for reducing the response speed purposely with the application of the setting of the touch panel response speed is low. Rather, it is preferable to place priority on high operability for immediately responding to a touch operation. Therefore, since the change of an enlarged position during enlarged display is regarded as a function that is less influenced by a false operation in the present embodiment, the setting of the "slow" touch panel response speed is not applied. That is, even if the setting of the "slow" touch panel response speed has been set, the system control unit 50 performs the function corresponding to the touch operation without performing the timer processing of S505 described above (that is, without setting a condition under which the touch operation is continuously performed for at least the predetermined time).

In S512, the system control unit 50 acquires current touch coordinates. Then, in S513, the system control unit 50 compares the current touch coordinates with the initial touch coordinates (the touch-down position) to acquire the amount of the change between the current touch coordinates and the initial touch coordinates. In S514, the system control unit 50 determines whether the touch-move has been performed on the basis of the amount of the change acquired in S513. When the amount of the change is at least a predetermined amount, the system control unit 50 determines that the touch-move has been performed and thus proceeds to S515. When the touch-move has not been performed, the system control unit 50 proceeds to S516. In S515, the system control unit 50 moves the enlarged position according to the touch-move. In this processing, the timer processing of S505 described above (particularly, the standby processing until the timer expires in S603) is not performed, and thus the response speed for a touch operation becomes faster correspondingly compared with a case in which the touch position is not enlarged. As a result, the user may comfortably change the enlarged position through the touch operation. In S516, the system control unit 50 determines whether touch-up has been performed. When the touch-up has been performed, the system control unit 50 ends the touch operation processing. When the touch-up has not been performed, the system control unit 50 returns to S512 to repeatedly perform the processing.

In the above description, no processing is performed when the touch-move has not been detected in S514. However, the processing of the system control unit 50 is not limited to this example. For example, the system control unit 50 may branch the processing into first processing and second processing according to the presence or absence of the touch-move and accept the operations of a plurality of functions, or may set the timer to one of the processing to apply the setting of the "slow" touch panel response speed. For example, in the above embodiment, no functions are assigned to touch-down and tapping (the operation of performing touch-up without moving a position after a touch) in the enlarged display screen. However, the system control unit 50 may assign functions to the touch-down and the tapping to perform control as follows. When touch-down and touch-move have been performed during enlarged display, the system control unit 50 changes an enlarged position according to the touch-move without performing standby processing based on a timer (first processing). On the other hand, when the touch-move has not been performed (when a touch position has not moved although the touch-down has been performed during the enlarged display), the system control unit 50 performs the timer processing of S505 if the "slow" touch panel response speed has been set. That is, when touch-up has been performed within the setting time of the timer, the system control unit 50 does not perform processing corresponding to tapping (the operation of touching and releasing without moving a position) for the purpose of preventing a false operation. On the other hand, when the touch-up has been performed after the elapse of the setting time of the timer, the system control unit 50 performs, for example, processing such as displaying a marker (focus guide) for displaying a focus guide for a MF operation at a tapped position as the processing corresponding to the tapping (second processing). The guide display of the focus is display showing a focus degree with respect to a position at which the focus guide has been displayed.

In the above embodiment, an example of the shooting standby screen is described as an example of the first screen to which the setting of the "slow" touch panel response speed is applied, and an example of the enlarged display screen is described as an example of the second screen to which the setting of the "slow" touch panel response speed is not applied. However, if screens have at least one of features like those described below as the first screen and the second screen, the control of the present invention is applicable to the screens. Note that the above shooting standby screen includes all the features of the first screen described below. The above enlarged display screen includes all the features of the second screen described below.

First Screen (Screen Which Places Priority on Preventing False Operation and to Which Setting of "Slow" Touch Panel Response Speed is Applied)

Standby screen displayed even if the user does not perform an operation after a device is activated.

Screen in which the function of changing the setting (shooting setting) of a device is assigned to touch-down or tapping.

Screen in which the function of changing a setting having influence on recorded content is assigned to touch-down or tapping.

Screen in which a function assigned to touch-move is not present.

Second Screen (Screen Which Places Priority on Response Speed and to Which Setting of "Slow" Touch Panel Response Speed is Not Applied)

Screen displayed in response to a user's operation other than an activation operation after a device is activated.

Screen in which the function of changing the setting (shooting setting) of a device is not assigned to touch-down or tapping.

Screen in which the function of changing a setting having influence on recorded content is not assigned to touch-down or tapping.

Screen in which the function assigned to touch-move is present.

In the above description, the function of changing the setting (shooting setting) of a device is, for example, the function of changing an AF position. In addition, the function of changing a setting having influence on recorded content is, for example, the function of changing an AF position. Note that the function of changing the display position of the above focus guide (display showing a focus degree) is not included in the function of changing a setting having influence on recorded content.

Figure 7A:
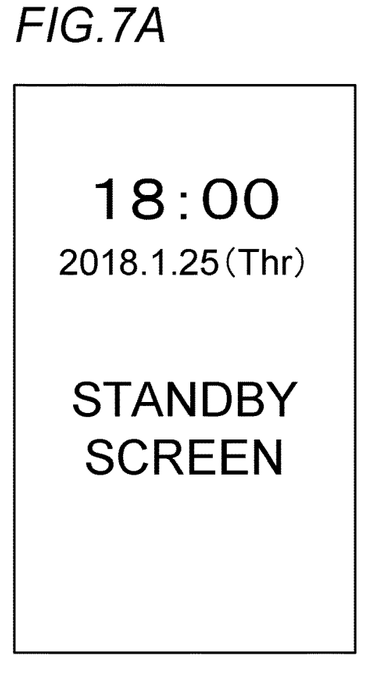
FIGS. 7A to 7D are display examples of the screens of an electronic device according to another embodiment.
Figure 7B:
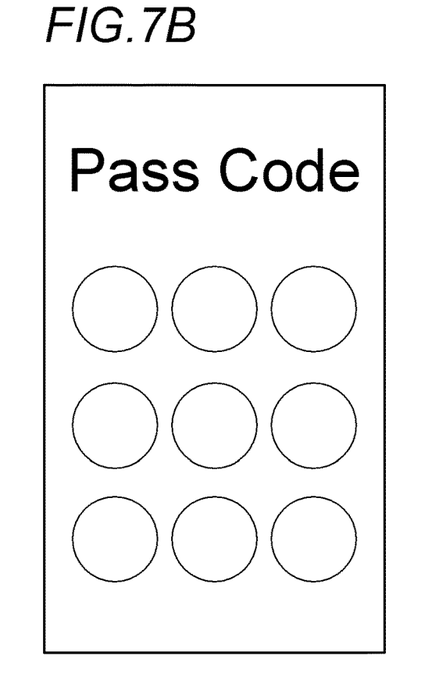
Figure 7C:
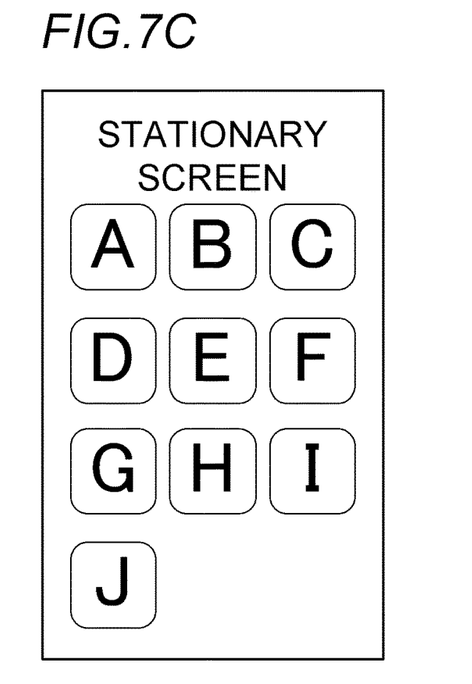
Figure 7D:
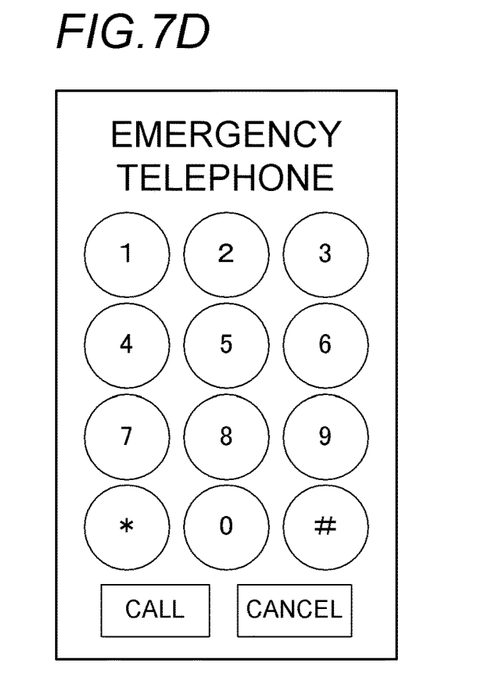

In the above embodiment, an action performed when an image output from the imaging unit 22 is displayed on the display unit 28 is described from the viewpoint of preventing a false operation in a camera that records an image. As another method, it is assumed that the setting of the "slow" touch panel response speed is applied to a case in which an image is being shot but is not applied to a case in which a recorded image is reproduced. That is, the setting of the "slow" touch panel response speed is applied to a screen (first screen) in a shooting mode but is not applied to a screen (second screen) in a reproduction mode. Thus, it becomes possible to perform an operation with an excellent response in the reproduction mode, while preventing a false shooting setting (such as an AF position) in the shooting mode and shooting under an unintended shooting setting. FIGS. 7A to 7D show an example of an embodiment in a case in which the same processing is applied to a smart phone instead of a digital video camera. FIG. 7A is a standby screen, FIG. 7B is a passcode input screen, FIG. 7C is a stationary screen, and FIG. 7D is an emergency telephone screen. When the "slow" touch panel response speed is set, it is assumed that the "slow" touch panel response speed is applied to the standby screen, the passcode input screen, and the stationary screen to prevent a false operation and is not applied to the emergency telephone screen to make an easy response in an emergency situation. That is, the standby screen, the passcode input screen, and the stationary screen are the first screens, and the emergency telephone screen is the second screen. Like this, the present invention is easily applied to various embodiments.

Note that the setting of the "slow" touch panel response speed may be applied regardless of the touch position of the display unit 28 (a touch operation screen allowing a touch operation) when the first screen is operated. Alternatively, the setting of the "slow" touch panel response speed may not be applied to a partial region of the first screen. For example, the setting of the "slow" touch panel response speed may not be applied only to a touch icon for transition to the emergency telephone screen.

Note that one hardware may perform the above various control performed by the system control unit 50 or a plurality of hardware (for example, a plurality of processors or circuits) may share the burden of processing to control the entire device.

In addition, the present invention is described in detail above on the basis of the preferred embodiments but is not limited to the specific embodiments. Various embodiments are also included in the present invention within the spirit of the present invention. Moreover, each of the respective embodiments shows only an embodiment of the present invention, and the embodiments may be appropriately combined together.

In addition, the above embodiments describe a case in which the present invention is applied to a digital video camera as an example. However, without being limited to this example, the present invention is applicable to any electronic device including an input device allowing a touch operation. That is, the present invention is applicable to personal computers, PDAs, mobile telephone terminals, mobile image viewers, printers including a display, digital photo frames, music players, video game machines, electronic book readers, or the like. In addition, the present invention is applicable to displays having a moving-image reproduction function, moving-image players, digital cameras, digital video cameras, moving-image editing devices, smart phones, tablet PCs, or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-056412, filed on Mar. 23, 2018, which is hereby incorporated by reference herein in its entirety.

What is claimed is:

1. An electronic device comprising:
a detector capable of detecting a touch operation on an operation surface; and
a memory and at least one processor which function as:
a control unit configured to perform one or more functions in response to one or more touch operations performed on an operation surface for at least a first period, and
a setting unit configured to set a response time to a second period longer than the first period in response to a user operation, wherein
the control unit performs control such that:
(1) when a first screen is displayed on a display surface in a case where the response time is set to the second period by the setting unit:
  (a) in response to a first touch operation having a duration time on the operation surface of less than the second period, not performing a function corresponding to the first touch operation, and
  (b) in response to a second touch operation having a duration time on the operation surface of at least the second period, performing a first function corresponding to the second touch operation and
(2) when a second screen is displayed on the display surface in a case where the response time is set to the second period by the setting unit:
  in response to a third touch operation having a duration time on the operation surface of at least the first period and less than the second period, performing a second function.

2. The electronic device according to claim 1, wherein in response to detection of starting of a respective touch operation on the operation surface, the control unit starts driving a timer to measure a duration time of the respective touch operation on the operation surface.

3. The electronic device according to claim 1, wherein The second touch operation is an operation in which a difference between a touch position when the second touch operation on the operation surface is started and a touch position after an elapse of the second period is less than a predetermined amount.

4. The electronic device according to claim 1, wherein when the first screen is displayed on the display surface, the control unit performs control to display, on the display surface, a remaining time until the duration time of a respective touch operation on the operation screen reaches the second period.

5. The electronic device according to claim 1, wherein the first screen is a standby screen displayed regardless of an operation by a user after the electronic device is activated, and
the second screen is a screen displayed in response to an operation by the user other than the activating operation after the electronic device is activated.

6. The electronic device according to claim 1, wherein the first screen is a screen in which a function of changing a setting of the electronic device is assigned to at least one of an operation of starting a touch and an operation of ending a touch without moving a position after a touch, and
the second screen is a screen in which the function of changing the setting of the electronic device is not assigned to the operation of starting a touch and the operation of ending a touch without moving the position after a touch.

7. The electronic device according to claim 1, wherein the electronic device is a device for performing control such that content is recorded on a recording medium, the first screen is a screen in which a function of changing a setting having influence on the content recorded on the recording medium is assigned to at least one of an operation of starting a touch and an operation of ending a touch without moving a position after a touch, and
the second screen is a screen in which the function of changing the setting having influence on the content recorded on the recording medium is not assigned to the operation of starting a touch and the operation of ending a touch without moving the position after a touch.

8. The electronic device according to claim 6, wherein the electronic device is capable of performing control such that automatic focusing is performed with respect to a set AF position, and
the function of changing the setting of the electronic device is a function of changing the AF position.

9. The electronic device according to claim 7, wherein the electronic device is capable of performing control such that automatic focusing is performed with respect to a set AF position, and the function of changing the setting having influence on the content recorded on the recording medium is a function of changing the AF position.

10. The electronic device according to claim 7, wherein the function of changing the setting having influence on the content recorded on the recording medium does not include a function of changing a display position showing a focus degree.

11. The electronic device according to claim 1, wherein the first screen is a screen in which a function assigned to an operation of moving a touch position after a touch is not present, and the second screen is a screen in which the function assigned to the operation of moving a touch position after a touch is present.

12. A method for controlling an electronic device, the method comprising:

detecting a touch operation on an operation surface; and performing control to:

perform one or more functions in response to one or more touch operations performed on an operation surface for at least a first period; and setting a response time to a second period longer than the first period in response to a user operation, such that:

(1) when a first screen is displayed on a display surface in a case where the response time is set to the second period by the setting unit:

(a) in response to a first touch operation having a duration time on the operation surface of less than the second period, not performing a function corresponding to the first touch operation, and (b) in response to a second touch operation having a duration time on the operation surface of at least the second period, performing a first function corresponding to the second touch operation and (2) when a second screen is displayed on the display surface in a case where the response time is set to the second period:

in response to a third touch operation having a duration time on the operation surface of at least the first period and less than the second period, performing a second function.

13. A non-transitory computer-readable storage medium storing a program for causing a computer to function as a control unit of the electronic device according to claim 1.

* * * * *